United States Patent
Bonacini

(10) Patent No.: US 9,139,055 B2
(45) Date of Patent: Sep. 22, 2015

(54) OPERATING HEAD FOR REMOVING AND FITTING WHEEL TIRES FOR VEHICLES

(75) Inventor: Maurizio Bonacini, Correggio (IT)

(73) Assignee: GIULIANO GROUP S.P.A., Correggio (IT)

(*) Notice: Subject to any disclaimer, the term of this patent is extended or adjusted under 35 U.S.C. 154(b) by 316 days.

(21) Appl. No.: 12/588,261

(22) Filed: Oct. 8, 2009

(65) Prior Publication Data

US 2010/0089538 A1 Apr. 15, 2010

(30) Foreign Application Priority Data

Oct. 13, 2008 (IT) .............................. MO2008A0265

(51) Int. Cl.
| | |
|---|---|
| B60C 25/135 | (2006.01) |
| B60C 25/132 | (2006.01) |
| B60C 25/138 | (2006.01) |
| B60C 25/05 | (2006.01) |

(52) U.S. Cl.
CPC ........... *B60C 25/138* (2013.01); *B60C 25/0578* (2013.04)

(58) Field of Classification Search
CPC ............ B60C 25/0578; B60C 25/0584; B60C 25/0563; B60C 25/0506
USPC .............. 157/1.17, 1.2, 1.22, 1.24, 1.26, 1.28
See application file for complete search history.

(56) References Cited

U.S. PATENT DOCUMENTS

| | | | | |
|---|---|---|---|---|
| 5,941,294 | A * | 8/1999 | Cunningham et al. | 157/1.24 |
| 6,453,971 | B2 * | 9/2002 | Vignoli | 157/1.22 |
| 7,048,026 | B2 * | 5/2006 | Bonacini | 157/1.28 |
| 7,743,812 | B2 * | 6/2010 | Sotgiu | 157/1.24 |
| 2004/0221964 | A1 | 11/2004 | Bonacini | |
| 2005/0247409 | A1 | 11/2005 | Corghi | |
| 2008/0179014 | A1 * | 7/2008 | Sotgiu | 157/1.3 |

FOREIGN PATENT DOCUMENTS

EP 1916125 4/2008

* cited by examiner

*Primary Examiner* — Bryan R Muller
(74) *Attorney, Agent, or Firm* — Young & Thompson

(57) ABSTRACT

An operating head for removing and fitting wheel tires for vehicles includes a support arrangement associable with an arm of a tire-changing machine, a removal tool having a substantially hook-shaped free extremity, associated with the support arrangement and moving between a fastening-on position of a section of the bead of a tire of a wheel fixed on the tire-changing machine and a position of extraction of the bead section from the rim of the wheel, and at least an actuator device supported by the support arrangement and associated with the tool, in which the actuator device is suitable for moving the tool between the fastening-on position and the extraction position.

16 Claims, 4 Drawing Sheets

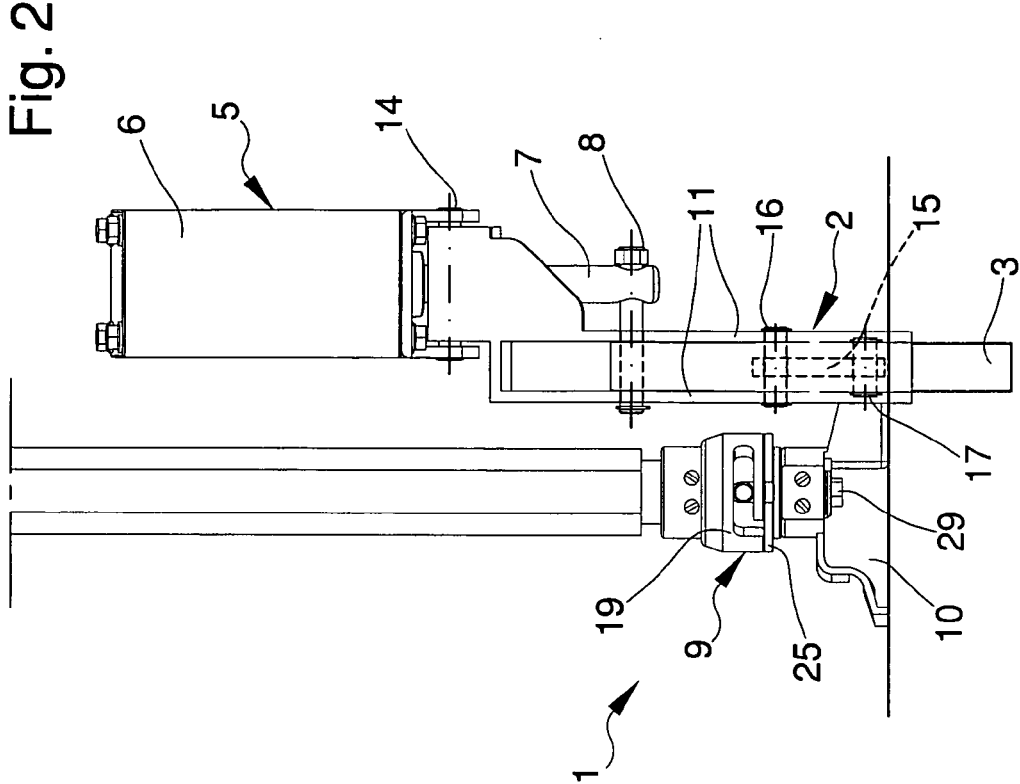
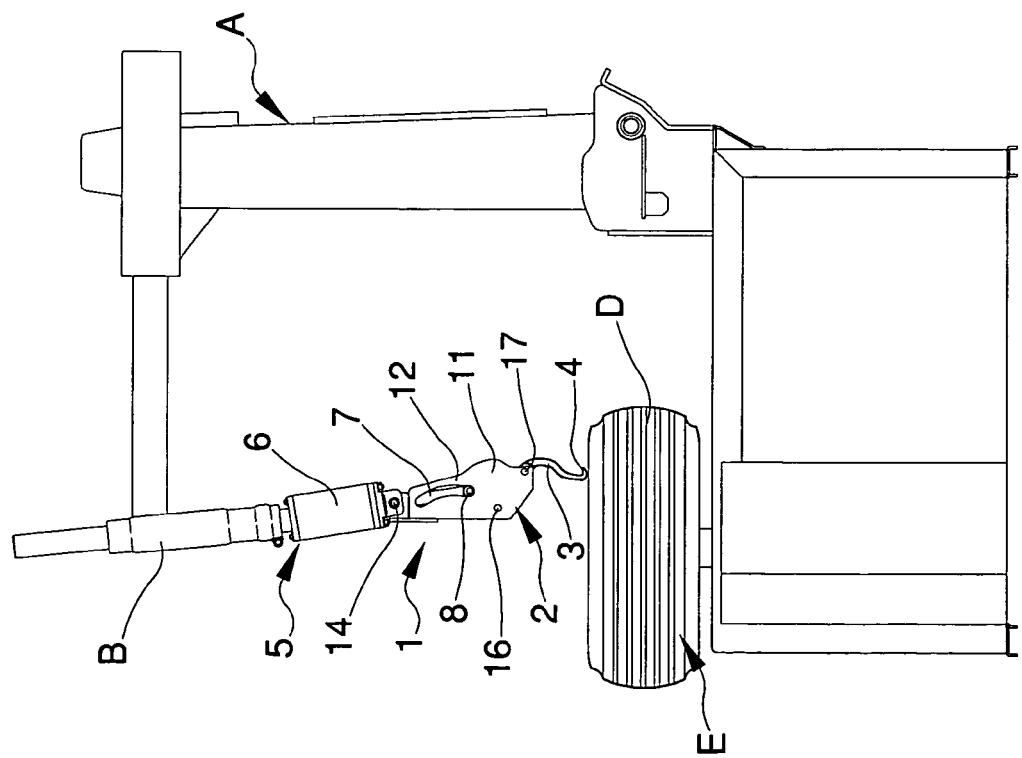

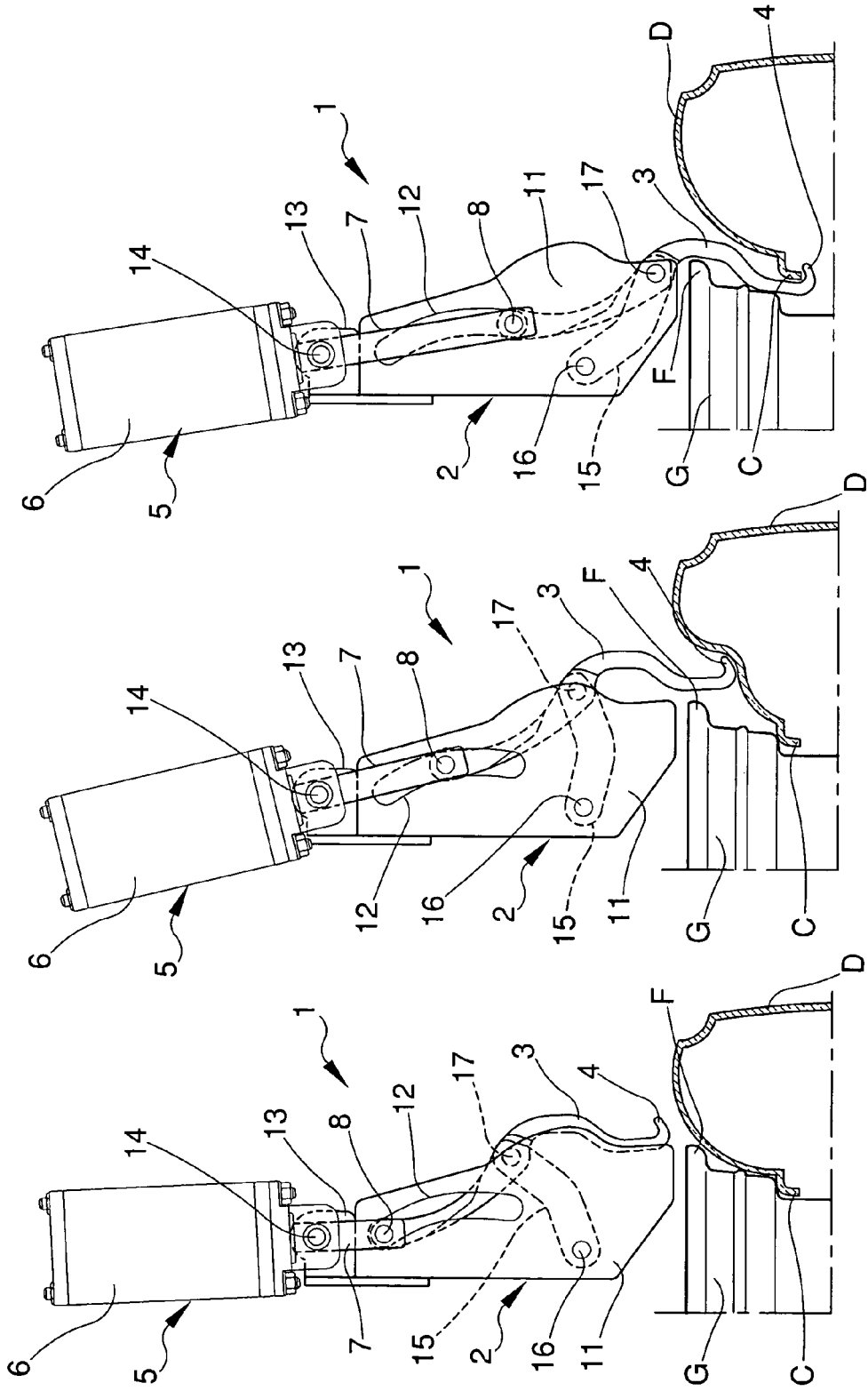

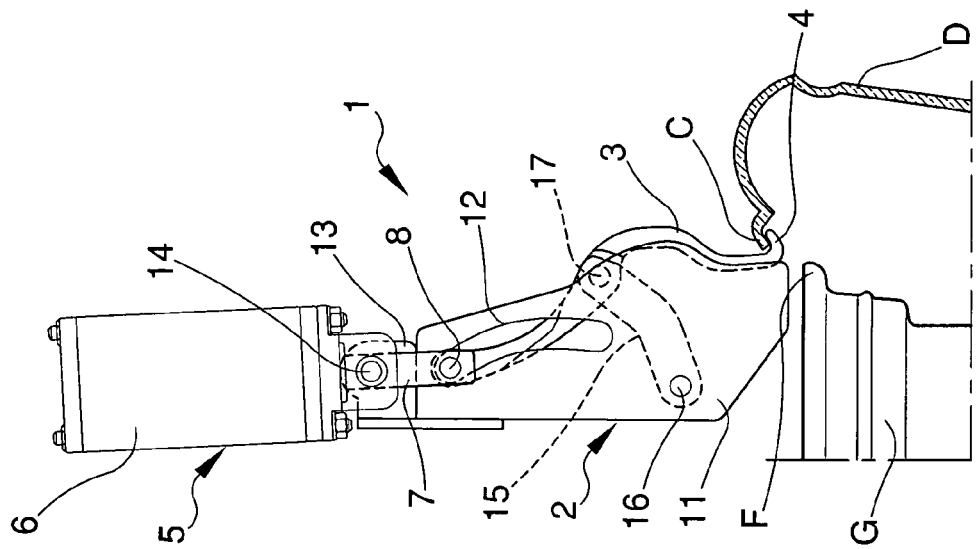
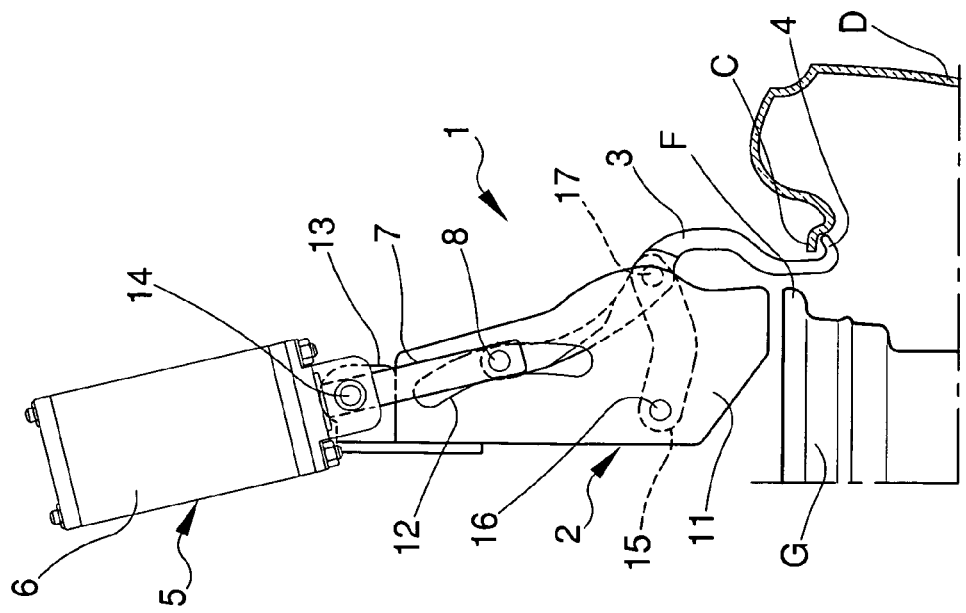

OPERATING HEAD FOR REMOVING AND FITTING WHEEL TIRES FOR VEHICLES

BACKGROUND OF THE INVENTION

1. Field of the Invention

The present invention relates to an operating head for removing and fitting wheel tires for vehicles.

2. The Prior Art

It is known that vehicle wheels generally comprise a metal rim having along the perimeter thereof annular flanges amid which are fitted fast up the end portions, so-called "beads", of an elastic tire.

The use is currently known of so-called "tire-changing" machines, suitable for removing and fitting the tire from the relevant rim for carrying out, e.g., maintenance, repair or replacement jobs.

In particular, different types of tire-changing machines of automatic type are known comprising an operating head having a retracting tool for removing the tire and which is associated with a mobile arm of the machine movable in terms of height and horizontally by means of relevant actuators.

The removal tool has a curved end part suitable for gripping the tire bead.

In particular, the removal tool is mobile, by means of a machine actuator commonly mounted on the mobile arm, between a bead gripping position, in which it extends from the operating head and positions between the annular flange of the rim and a section of the tire to be removed, and a position of extraction of the edge of the tire, in which it is raised to extract the section of the bead gripped above the annular flange of the rim.

During use, an operator positions and blocks the wheel on the coupling and rotation means and, by means of a special beading tool, performs a first preliminary detachment phase of the tire bead from the annular flanges of the rim.

Subsequently, the operator regulates the position of the operating head with respect to the frame according to the specific dimensions of the wheel.

The tool is then conveyed to the coupling position and the end part of the tool presses on the side of the tire until it is introduced between the tire bead and the relevant flange on the rim, until the hooked extremity of the tool is positioned so as to withhold the tire bead.

Subsequently, the tool is positioned in the extraction position so as to extract a portion of the bead above the rim.

The rotation of the rim then enables the entire bead to come out of the respective flange.

These known machines do however have a number of drawbacks.

The movement of the tool in fact is performed by means of one or more tire-changing machine actuators, generally integrated on the mobile arm of the machine itself.

This necessarily means using operating heads that have specific structural characteristics for each tire-changing machine and which are therefore hard to adapt for use on different tire-changing machines.

Furthermore, during the removal operations performed with the operating heads commonly used, unwanted deformations of the tire bead can occur, due mainly to the excess tension exercised by the tool during the extraction movement of the bead above the annular flange of the rim.

The main aim of the present invention is to provide an operating head for removing and fitting wheel tires for vehicles that can be installed in a simple and quick way on different types of tire-changing machines.

Another object of the present invention is to provide an operating head for removing and fitting wheel tires for vehicles that allows reducing the tensions exercised by the tool on the tire bead during the extraction movement above the annular flange of the rim.

Another object of the present invention is to provide an operating head for removing and fitting wheel tires for vehicles that allows to overcome the mentioned drawbacks of the background art in the ambit of a simple, rational, easy, effective to use and low cost solution.

SUMMARY OF THE INVENTION

The above objects are achieved by this operating head for removing and fitting wheel tires for vehicles, comprising a support arrangement associable with the arm of a tire-changing machine, at least a removal tool having a substantially hook-shaped free extremity, associated with said support arrangement and moving between a fastening-on position of at least a section of the bead of a tire of a wheel fixed on said tire-changing machine and a position of extraction of said bead section from the rim of said wheel, wherein it comprises at least an actuator device supported by said support arrangement and associated with said tool, said actuator device being suitable for moving said tool between said fastening-on position and said extraction position.

Other characteristics and advantages of the present invention will become more evident from the description of a preferred, but not sole, embodiment of an operating head for removing and fitting wheel tires for vehicles, illustrated purely as an example but not limited to the annexed drawings.

BRIEF DESCRIPTION OF THE DRAWINGS

FIG. 1 is a side view of the operating head according to the invention mounted on a tire-changing machine;

FIG. 2 is a front view of the operating head according to the invention;

FIGS. 3 to 7 are side views that illustrate the use of the operating head according to the invention during a removing operation of a tire;

DETAILED DESCRIPTION OF THE PREFERRED EMBODIMENT

Figure 9:
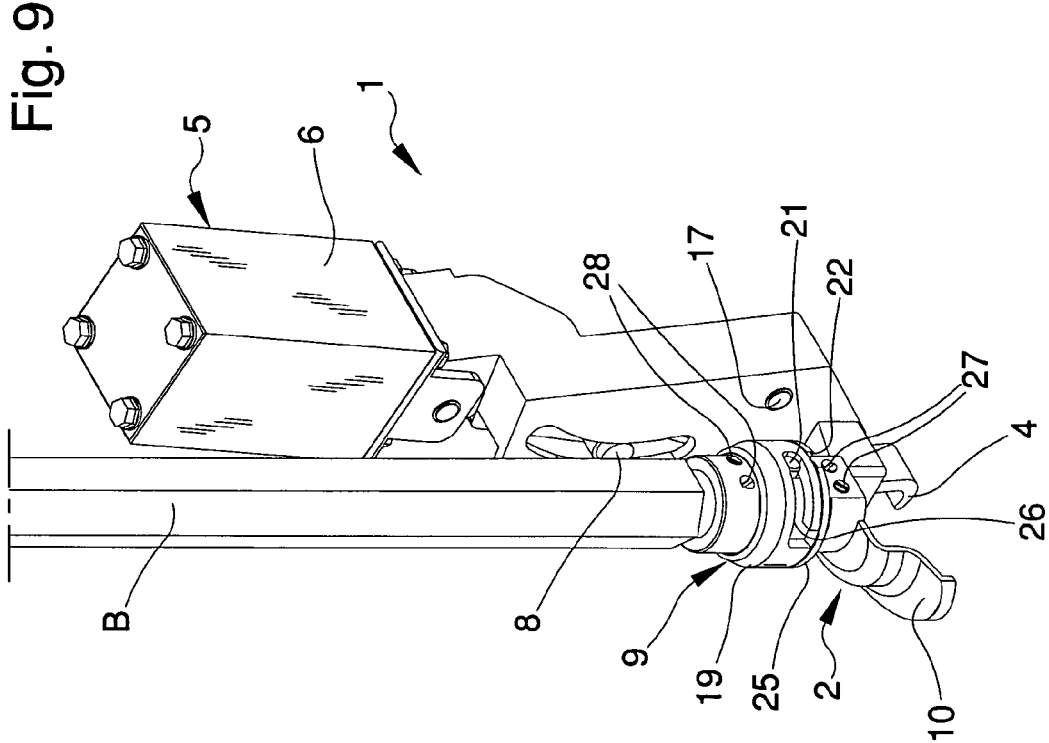
FIG. 9 is an axonometric view of the operating head according to the invention.
Figure 8:
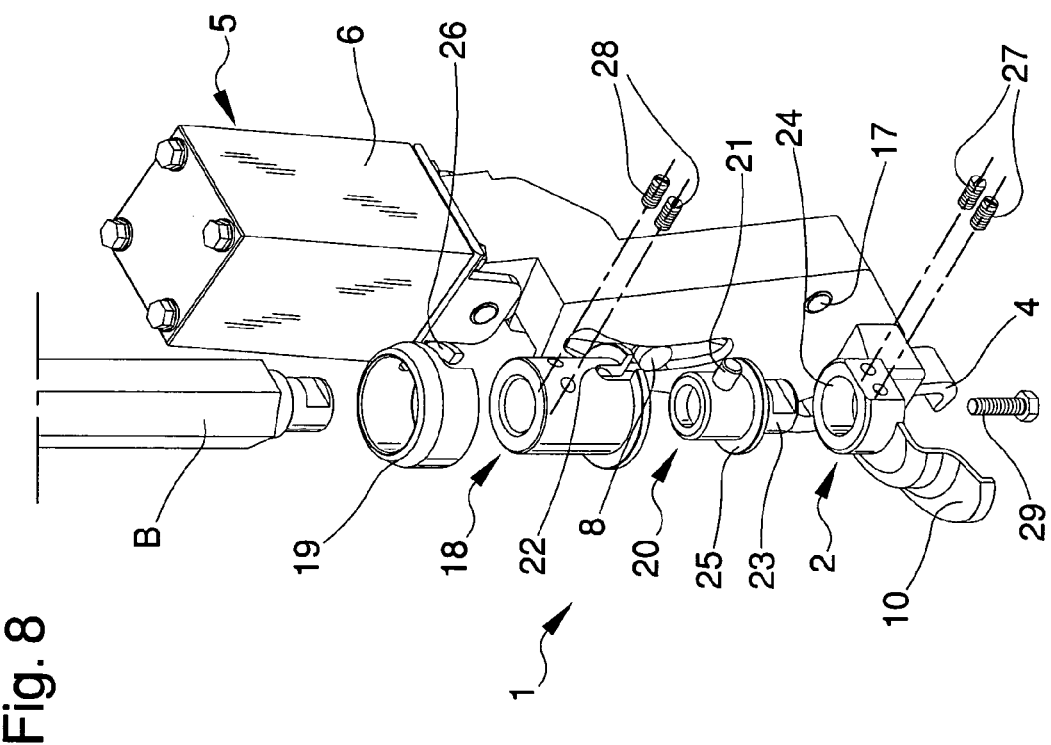
FIG. 8 is an axonometric and partial exploded view of the operating head according to the invention.

With particular reference to the figures, globally indicated by 1 is an operating head usable for removing and fitting wheel tires for vehicles onto/from the respective rims thereof and associable with a traditional tire-changing machine, of the type shown by way of example in FIG. 1 and generally denoted by reference A.

The operating head 1 comprises a support arrangement 2 associable with the mobile arm B of a tire-changing machine A and suitable for supporting a removal tool 3.

The tool 3 has a substantially elongated conformation and a substantially hook-shaped free extremity 4.

Furthermore, the tool 3 is movable between a position of gripping a section of the bead C of the tire D of a wheel E fixed to the tire-changing machine A (FIG. 5), and a position of extraction of the section of the bead C beyond the annular flange F of the rim G of the wheel E (FIG. 7).

Advantageously, the operating head 1 comprises an actuator device 5 which supports the support arrangement 2 and is operatively associated with the tool 3 to move it between the above gripping and extraction positions.

The operating head 1, having the actuator device 5 of its own, can be mounted on the mobile arm B of any tire-changing machine A without the technical limits and the adaptation difficulties which, in the current state of the art, generally ensue from the necessary adaptation of the operating head to the specific actuator device of the machine.

With specific but not limited reference to the particular embodiment of the operating head 1 shown in the above illustrations, the actuator device 5 is composed of a linear actuator of the type of a pneumatic cylinder or the like.

The use of an actuator device 5 of different type and/or in different numbers cannot however be ruled out.

In particular, the actuator 5 comprises a first portion 6, composed of the liner of the pneumatic cylinder, which is associated with the support arrangement 2, and a second portion 7, composed of the rod of the pneumatic cylinder, which is mobile along a straight direction and which is hinged to the extremity of the tool 3 opposite the hook-shaped free extremity 4, at a first pin 8.

Usefully, in an alternative embodiment to that shown in the illustrations, the actuator device 5 can be associated with the support arrangement 2 by means of a quick coupling, so as to allow easier installation and replacement.

In the particular embodiment of the operating head 1 shown in the above illustrations, the support arrangement 2 comprises a quick coupling device, indicated altogether with the reference 9, fixable to mobile arm B of the tire-changing machine A.

Furthermore, the support arrangement 2 have a portion shaped to define a resting element 10, which can be positioned at a section of the edge of the rim G during the removal operations of the tire D and which can be used to sustain the bead C of the tire D during the fitting operations.

In particular, the resting element 10 has a substantially widened shape which at least in part reproduces a section of the perimeter profile of the edge of the rim G.

The support arrangement 2 further comprise a pair of substantially plate-shaped support elements 11, vertical and parallel with one another and separated, between which the tool 3 is supported, which are fixed to a side portion of the resting element 10.

Advantageously, the operating head 1 comprises a transformation arrangement for transforming the movement generated by the actuator 5 into a rotary-translation movement of the tool 3.

In particular, such transformation arrangement of the movement moves the tool 3 between the gripping position and the extraction position and, during such movement, the hook-shaped free extremity 4 of the tool itself substantially follows the inner profile of the rim G which goes from the bead stop annular flange F as far as the inner housing channel of the tire.

Such movement of the hook-shaped free extremity 4 permits reducing to the utmost the tensions undergone by the bead C of the tire D during removal operations.

In particular, the movement transformation arrangement comprises a pair of curved guides 12, made up of curved slots obtained on the support elements 11, inside which the first pin 8 engages sliding.

Usefully, the liner 6 of the actuator 5 is hinged to an appendix 13 of one of the support elements 11, at a second pin 14, so as to allow the rod 7 to swing according to the trajectory of the first pin 8 inside the curved slots 12.

The movement transformation arrangement also comprises a connecting rod 15 having an extremity hinged to the support elements 11, at a third pin 16, and an opposite extremity hinged to a substantially intermediate portion of the tool 3, at a fourth pin 17.

The sliding of the first pin 8 inside the curved slots 12, together with the rotation of the connecting rod around the third pin 16, thanks to suitable sizing and a suitable shape of the tool 3, allow obtaining the above movement of the hook-shaped free extremity 4 along the inner profile of the rim G so as to reduce to the utmost the tensions undergone by the bead C of the tire D during removal operations.

Usefully, at least a section of the tool 3 is shaped so as to reproduce part of the inner profile of the rim G, at the annular flange F as far as the inner channel of the rim G.

Advantageously, the quick coupling device 9 comprises a sleeve 18 associable with the arm B of a tire-changing machine A and a securing element 19 for securing-by-rotation the resting element 10 on the sleeve 18.

The quick coupling device 9 also comprises adjustable an engagement element 20 placed in between the resting element 10 and the sleeve 18.

The adjustable engagement element 20 is in turn equipped with coupling parts 21 at one degree of freedom with the sleeve 18, which are composed of a pin overhanging horizontally from the adjustable engagement element 20 and suitable for engaging a corresponding vertical groove 22 obtained in the sleeve 18.

In particular, the adjustable engagement element 20 is composed of a cylindrical tube having at its lower extremity a prong 23 insertable in a corresponding hollow cavity 24 obtained inside the resting element 10.

Furthermore, the cylindrical tube 20, at a substantially median portion, has a radial overhanging collar 25 against which the lower extremity of the sleeve 18 is positionable up fast.

Finally, the securing element 19 is composed of a cylindrical ring nut which is fitted on the sleeve 18, free to turn and having an L-shaped slot 26 for the introduction and the engagement with the pin 21.

The operating head 1 operates as follows.

Once mounted on the mobile arm B of a tire-changing machine by means of the quick-coupling device 9, the operating head 1 can be used for removing and fitting the tire D of a wheel E.

In particular, during the removal operation of the tire D, the operating head 1 is moved by means of the arm B and is lowered until the resting element 10 reaches the perimeter edge of the rim G; in this initial position, the tool 3 is in extraction position (FIG. 3).

By means of the actuator 5, the tool is then conveyed from the extraction position as far as the gripping position, with a movement of the hook-shaped free extremity 4 that follows the inner profile of the rim G (FIGS. 4 and 5).

In this gripping position, the free extremity positions underneath the bead C and grips it (FIG. 5).

Always by means of the actuator 5, the tool 3 is then returned from the gripping position to the extraction position with the lifting of the section of the bead C gripped above the annular flange F of the rim G (FIGS. 6 and 7).

The subsequent rotation of the wheel E allows extracting the bead C from the annular flange of the rim G along the entire perimeter of the tire D.

With reference to the use of the quick coupling device 9, when the operator has to work on a tire fitted on a wheel of predefined diameter, he/she chooses the operating head 1 suitable for the purpose, which has a tube 20 with the prong 23 already engaged in the specific hollow cavity 24 and secured by means of the dowels 27.

Subsequently, the same tube 20 is engaged in the sleeve 18 by coupling together the pin 21 and the vertical groove 22.

The sleeve 18 is fixed at the top of the arm B by means of the further dowels 28, which engage on a corresponding seat on the arm B, and by means of the screw 29, which fits in a corresponding thread on the arm B withholding the sleeve 18. On the sleeve 18 is fitted the ring nut 19, the rotation of which, when the pin 21 is fast up on the slot 26, secures the operating head 1 in operating position.

By turning the ring nut 19 in the direction opposite to that of securing, the tube 20 is released and, consequently, also the mounted operating head 1 which can thus be quickly removed.

It has in fact been ascertained how the described invention achieves the proposed objects, and in particular, the fact is underlined that the presence of the actuator device, together with the presence of the quick coupling device, also allows the easy use of the operating head according to the invention even on different types of tire-changing machines, eliminating or in any case reducing to the utmost the need to make structural changes to the operating head or to the machine itself.

Furthermore, the particular transformation arrangement of the movement of the tool of the operating head according to the invention, which in particular move the curved free extremity of the tool and keep it in proximity of the inner profile of the rim, allow considerably reducing the tensions exercised by the tool on the tire bead during the extraction above the annular flange of the rim.

The invention claimed is:

1. An operating head for removing and fitting wheel tires for vehicles, comprising:
   a support arrangement configured to be removably connected to a lower end of a mobile arm of a tire-changing machine, said support arrangement comprising at least a portion shaped to define a resting element positionable close to a section of an edge of a wheel rim during removal of a tire therefrom;
   a removal tool having a substantially hook-shaped free extremity, attached to a first end of said support arrangement and adapted for moving between an extended fastening-on position and a retracted position of extraction; and
   an actuator device pivotally attached to a second end of said support arrangement and configured to actuate said tool, said actuator device being adapted for moving said tool between said fastening-on position and said extraction position, said actuator device comprising a first portion connected with said support arrangement, and a second portion sliding with respect to said first portion along a substantially straight direction and connected with said tool; and
   a quick coupling arrangement connecting the support arrangement with the actuator device, the quick coupling arrangement being fixable to the mobile arm, the quick coupling device comprising a sleeve configured to be connected to the mobile arm of the tire changing machine and a securing element for rotatably securing a resting element on the sleeve, the securing element being a free turning cylindrical ring nut fitted on the sleeve, the quick coupling device further comprising an engagement element placed in between said support device and said sleeve, the engagement element comprising coupling parts which comprises a pin overhanging horizontally from said engagement element and engaging at least a corresponding vertical groove in said sleeve, wherein
said securing element comprises the cylindrical ring nut turnably fitted on said sleeve and having a substantially L-shaped slot for introduction and engagement of said pin.

2. The operating head according to claim 1, wherein said actuator comprises a linear actuator.

3. The operating head according to claim 2, wherein said linear actuator is turnable relative to said support arrangement.

4. The operating head according to claim 1, wherein said second portion of the actuator is hinged to said tool at a first pin.

5. The operating head according to claim 4, wherein said second portion of the actuator is hinged to said tool by said first pin at an extremity of said tool substantially opposite said hook-shaped free end.

6. The operating head according to claim 4, further comprising a transformation assembly for transforming movement generated by said actuator into a rotary-translation movement of said tool, in which said tool is moved between said attachment position and said removal position and said substantially hook-shaped free end at least partially follows a profile of the wheel rim, and wherein said transformation assembly comprises a curved guide in which said first pin slidingly moves.

7. The operating head according to claim 6, wherein said curved guide comprises a curved slot in a support element of said support device inside which said first pin slidingly moves.

8. The operating head according to claim 7, wherein said actuator is hinged to said support element at a second pin.

9. The operating head according to claim 7, wherein said transformation assembly comprises a connecting rod having an extremity pivotally attached to said support element at a third pin and an opposite extremity hinged to a fourth pin at a substantially intermediate portion of said tool.

10. The operating head according to claim 1, further comprising a transformation assembly for transforming the movement generated by said actuator into a rotary-translation movement of said tool, in which said tool is moved between said attachment position and said removal position and said substantially hook-shaped free end at least partially follows a profile of said wheel rim.

11. The operating head according to claim 1, wherein said tool has a substantially elongated shape and at least one section thereof is shaped to reproduce part of an inner profile of said wheel rim.

12. The operating head according to claim 1, wherein said resting element has a substantially widened shape and reproduces at least in part a perimeter profile of said wheel rim.

13. The operating head according to claim 1, wherein said support element is integral with said resting element.

14. The operating head according to claim 1, wherein said engagement element comprises a cylindrical tube having at a lower extremity a prong insertable in a corresponding hollow cavity in the support arrangement and, at a substantially median portion, a collar overhanging radially up against the lower extremity of said sleeve.

15. An operating head for removing and fitting wheel tires for vehicles, comprising:
   a mobile arm of a tire-changing machine;
   a support arrangement connected with and removable from a lower end of the mobile arm of a tire-changing machine, said support arrangement comprising at least a portion shaped to define a resting element positionable close to a section of an edge of a wheel rim during removal of a tire therefrom;

a hook attached to a first end of said support arrangement and adapted for moving between an extended fastening-on position and a retracted position of extraction; and an actuator pivotally attached to a second end of said support arrangement and configured to actuate said hook, said actuator being adapted for moving said tool between said fastening-on position and said extraction position, said actuator comprising a first portion connected with said support arrangement, and a second portion sliding with respect to said first portion along a substantially straight direction and connected with said tool; and a quick coupling arrangement connecting the support arrangement with the actuator device, the quick coupling arrangement being fixable to the mobile arm, the quick coupling device comprising a sleeve connected with the mobile arm, an engagement element placed in between said support device and said sleeve, the engagement element comprising coupling parts which comprise a pin overhanging horizontally from said engagement element and suitable for engaging at least a corresponding vertical groove in said sleeve, and a securing element for rotatably securing a resting element on the sleeve, the securing element being a free turning cylindrical ring nut fitted on the sleeve, wherein said securing element comprises the cylindrical ring nut turnably fitted on said sleeve and having a substantially L-shaped slot for the introduction and engagement of said pin.

16. The operating head according to claim 15, wherein said engagement element further comprises a cylindrical tube having at a lower extremity a prong insertable in a corresponding hollow cavity in the support arrangement and, at a substantially median portion, a collar overhanging radially up against the lower extremity of said sleeve.

* * * * *